HIGH FREQUENCY TRIGGER CONVERTERS EMPLOYING NEGATIVE RESISTANCE ELEMENTS

Filed Sept. 19, 1960

INVENTOR
VICTOR VAN DUZER
BY J. L. Chapman
ATTORNEY 3,040,186

HIGH FREQUENCY TRIGGER CONVERTERS EMPLOYING NEGATIVE RESISTANCE ELEMENTS

Victor E. Van Duzer, Mountain View, Calif., assignor to Hewlett-Packard Company, Palo Alto, Calif., a corporation of California Filed Sept. 19, 1960, Ser. No. 56,718
5 Claims. (Cl. 307—88.5)

Figure 1:
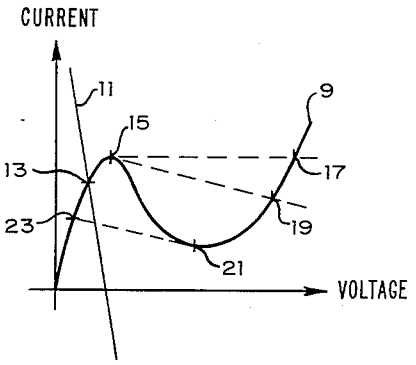

This invention relates to high frequency trigger circuits and more particularly to a tunnel diode circuit which can operate either as a subharmonic frequency converter or as a trigger circuit in accordance with bias conditions established for the tunnel diode.

Electronic equipment is frequently required to operate synchronously with applied signals. Oscilloscopes, for example, can display high frequency waveforms as stationary patterns on the screen of a cathode ray tube by displaying the waveform under examination once per given number of recurrences on a selected time base. The time base is provided by a sweep voltage which is synchronized with the applied waveform. Thus, the circuit used to synchronize the sweep voltage with the waveform under examination can operate at a frequency that is equal to or is a subharmonic of the applied signal frequency. When the applied signal is very high in frequency, it is desirable to operate the synchronizing circuit at a lower or subharmonic frequency, and when the applied signal is relatively low in frequency it is desirable to operate the synchronizing circuit at the frequency of the applied signal.

The waveform applied to the synchronizing circuit of electronic equipment may have varied shapes and rise times and may thus cause time jitter in the operation of the equipment because of the lack of a sharply defined trigger point. It is desirable, then, to synchronize the operation of the equipment on uniformly shaped pulses which have a repetition frequency that is related to the applied signal frequency and which have sharp wavefronts. This permits the operation of the electronic equipment to be triggered on the sharp wavefront at substantially the same instant relative to the start of each selected recurrence of the applied waveform.

A trigger circuit which produces uniformly shaped pulses having the repetition frequency of a low frequency applied signal and which produces uniformly shaped pulses at a subharmonic of a high frequency applied signal permits the use of a less expensive, simpler synchronizing circuit. In addition, such a trigger circuit may be used as a synchronizing circuit directly.

Accordingly, it is an object of the present invention to provide a triggering circuit which produces uniformly shaped synchronizing pulses either at a subharmonic of an applied high frequency signal or at the repetition rate of an applied low frequency signal.

It is another object of the present invention to provide a tunnel diode circuit which produces uniformly shaped output pulses independent of the frequency of operation and which has relatively high sensitivity to applied signals of narrow pulse width.

In accordance with the illustrated embodiment of the present invention, a relaxation oscillator comprising an inductor and a tunnel diode is provided with a variable supply voltage to permit operation in the astable or monostable conditions. In addition, an input circuit comprising two forward biased diodes is provided to control the application of switching current to the tunnel diode and thereby control the initiation of output pulses derived from the voltage across the tunnel diode. The two diodes are connected to provide isolation between input and output terminals and to provide high input impedance to a low impedance circuit.

Figure 4:
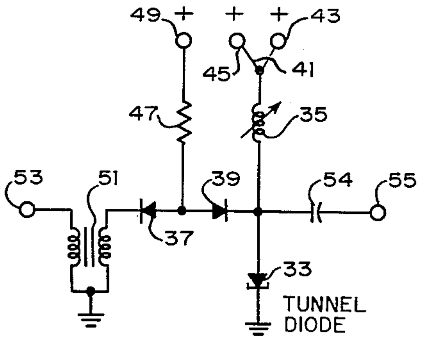

Other and incidental objects of the present invention will be apparent from a reading of this specification and an inspection of the accompanying drawing in which:

FIGURE 1 is a graph of the current-voltage characteristics of a tunnel diode showing the location of a load line for triggered converter operation of the circuit of FIGURE 4.

Figure 2:
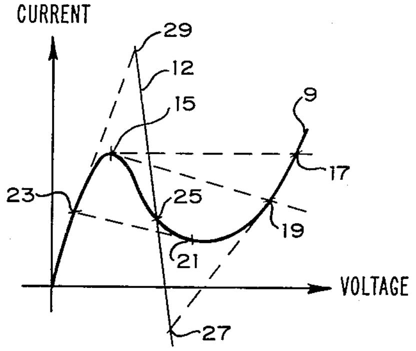
Figure 3:
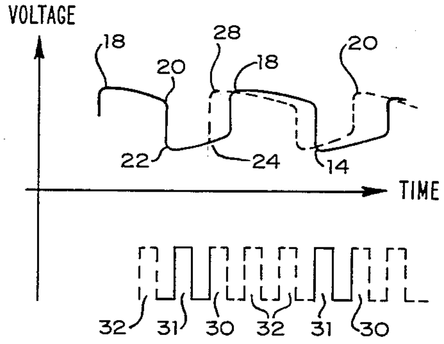

FIGURE 2 is a graph of the current-voltage characteristics of a tunnel diode showing the location of a load line for subharmonic converter operation of the circuit of FIGURE 4, FIGURE 3 is a graph of the output waveform as a function of time of the converter circuit of FIGURE 4 wherein the tunnel diode is operated according to the graph of FIGURE 2, and FIGURE 4 is a schematic diagram of a trigger converter in accordance with the illustrated embodiment of the present invention.

Referring now to FIGURE 1, the current-voltage characteristic of a tunnel diode is shown as curve 9. Load line 11, which passes through the characteristic curve 9 at the operating point 13, is determined by the power supply voltage available and by the equivalent resistance of a tunnel diode circuit, such as the circuit of FIGURE 4. Load line 11, which passes through the positive slope portion of curve 9, establishes a stable mode of operaation for the tunnel diode circuit. This can be seen by examining the circuit of FIGURE 4 when a positive current pulse is applied to the tunnel diode. The pulse must have sufficient amplitude to move the operating point momentarily beyond the peak 15 of curve 9. This causes the tunnel diode to switch to a higher voltage operating point 17 on curve 9 since the current through the inductor cannot change instantaneously. The transition occurs in less than $2\times10^{-9}$ seconds. If the tunnel diode is loaded, the transition is to point 19. This is the result of current being extracted from the inductor by the load during the transition time. As time progresses, the current through and the voltage across the tunnel diode varies along curve 9 to the minimum or "valley" point 21. This is due to the fact that the power supply voltage is not sufficient to sustain the tunnel diode current with a larger voltage drop across the diode. From point 21 the transition occurs to the lower voltage conduction state 23. The operating point of the circuit moves with time from point 23 along curve 9 to the operating point 13, which point is the quiescent operating point of the circuit.

In this mode of operation, a positive current pulse is supplied which has an amplitude just in excess of the current difference between points 15 and 13 on curve 9. As point 13 is moved closer to the peak point 15, the sensitivity becomes increasingly great. As point 13 is moved away from point 15 along curve 9 the sensitivity to input current pulses becomes increasingly less. The sensitivity to input current pulses, then, is controlled by the location of point 13 along the positive characteristic slope of curve 9.

Referring to FIGURE 2, the current-voltage characteristic curve 9 of a tunnel diode is shown with operating point 25 in the negative resistance region between the peak and valley points 15 and 21 respectively. The load line is again determined by the available supply voltage and by the equivalent circuit resistance. In operation, the current through the tunnel diode increases along curve 9 from the origin toward the operating point 29 which is asymptotically determined by the slope of curve 9 as a result of the supply voltage across the tunnel diode. When the current increases to a value sufficiently high, a transition between point 15 and point 19 on curve 9 occurs in a time of less than $2\times10^{-9}$ seconds. The slope of curve 9 at the point of intersection 19 asymptotically determines an operating point 27 on load line 12. However, the current through and the voltage across the tunnel diode varies with time along curve 9 to point 21. When the tunnel diode current reduces to a value just below the valley point 21, a transition occurs to point 23 on the positive slope portion of curve 9 between the origin and point 15. The slope of curve 9 at point 23 asymptotically determines a new operating point 29 on load line 12. However, as time progresses the tunnel diode current increases along the positive slope of curve 9 from point 23 to the peak point 15 as a result of the large difference between the supply voltage and the voltage across the diode. A transition again occurs to point 19 when the diode current increases to a value slightly greater than point 15 and the cycle repeats.

Thus, a circuit biased according to the graph of FIGURE 2, operates astably to produce a waveform as shown in FIGURE 3. The frequency of the waveform is determined by the physical and distributed parameters of the circuit. The diode current variations occur with a time constant that is determined by the sum of coil and lead inductances divided by the equivalent circuit resistance.

Referring now to FIGURE 3, which shows a waveform produced by the tunnel diode circuit of FIGURE 4, the effect of current pulses related to the applied signal is shown. The variation in the amplitude of the waveform between points 22 and 14 is attributed to the slope between points 23 and 15 respectively of curve 9 of FIGURE 2. The variation in the amplitude of the waveform between points 18 and 20 is attributed to the slope between points 19 and 21 respectively of curve 9 of FIGURE 2. The leading edges of the pulses 30 which represent the current applied to the tunnel diode when diode 39 turns on, produce a transition between points 24 and 28 at a time which is just prior to the normal time of transition from point 14 to point 18, thereby shifting the repetition frequency of the output pulses slightly about the normal frequency of oscillation. Pulses 31 represent the current applied to the tunnel diode when diode 39 is conducting. These pulses are not of sufficient amplitude to momentarily shift the operating point of the circuit beyond peak point 15 and hence cannot affect a transition between conduction states. And pulses 32 represent the intervals when current should be applied to the tunnel diode but is not since diode 39 is held cut off by the voltage across the tunnel diode in the high voltage conduction state. Thus, by applying pulses of proper polarity and amplitude to the free running tunnel diode circuit of FIGURE 4, it is possible to vary the repetition frequency of the output waveform about the normal repetition frequency to synchronize it with a subharmonic of the applied signal frequency. For example, a one kilomegacycle per second applied signal produces output pulses having a repetition rate of ten megacycles per second.

Referring now to FIGURE 4, which shows a schematic diagram of a tunnel diode trigger converter circuit in accordance with the illustrated embodiment of the present invention, a relaxation oscillator comprising serially connected tunnel diode 33 and variable inductor 35 is shown. A variable inductor 35 is provided to adjust the normal frequency of oscillation to a selected value, say ten megacycles. Switch 41 is provided to connect the oscillator to supply 43 for operation in accordance with the graph of FIGURE 1, and to connect the oscillator to supply 45 for operation in accordance with the graph of FIGURE 2. Power supply 49 is connected to the common terminal of variable inductor 35 and tunnel diode 33 through resistor 47 and forward biased diode 39. Diode 37 is also connected to power supply 49 through resistor 47. Transformer 51 is provided to apply the input signal to diode 37, which transformer also provides a direct current path for the forward bias current through diode 37. By reversing the winding connections it is also possible to invert the polarity of the applied signal on which the output pulses are synchronized.

In operation, diode 37 is forward biased by the current which flows through resistor 47 and through the secondary winding of transformer 51 to ground. Diode 39 may be slightly forward biased or cut off depending on the total voltage drop that appears across conducting diode 37 and tunnel diode 33. When the signal appearing at input terminal 53, which is coupled to diode 37 through transformer 51, is of sufficient amplitude and polarity to cut diode 37 off, the current which previously flowed through the forward biased diode 37 then flows through diode 39 and tunnel diode 33 to ground. If tunnel diode 33 is biased according to the graph of FIGURE 1, the current pulse applied to the tunnel diode will be sufficient to cause the transition from the low voltage conduction state to the high voltage conduction state. The jump in the voltage across tunnel diode 33, which is coupled to output terminal 55 by capacitor 54, initiates an output pulse. The discharging time constant is determined by the values of equivalent resistance and inductance in the circuit. When the transition from the high voltage conduction state to the low voltage conduction state occurs, the output pulse appearing at the output terminal 55 is terminated and diode 37 is returned to the conducting state. Tunnel diode 33 returns to the quiescent operating point 13 which is determined by the equivalent circuit resistance and the power supply voltage. Thus, an output pulse is produced at terminal 55 for each recurrence of a signal applied to input terminal 53.

If tunnel diode 33 is biased according to the graph of FIGURE 2, then the waveform appearing in output terminal 55 is substantially similar to the waveform shown in FIGURE 3. Signal applied to input terminal 53 and coupled to diode 37 by transformer 51 causes diode 37 to cut off, thereby turning diode 39 on. The increased current through tunnel diode 33, which is operating in the free running mode may or may not be sufficient to cause the transition from one conduction state to the other conduction state. If the transition occurs, diode 37 is held cut off during the time that tunnel diode 33 is in the high voltage conduction state. Thus, signal applied to input terminal 53 during the time that diode 37 is not conducting cannot affect the operation of the tunnel diode oscillator. In addition, non-conducting diode 37 provides isolation between the output terminal 55 and input terminal 53, thereby precluding reflections of the output pulses from appearing at the inutput terminal 53. Also, non-conducting diode 37 provides high input impedance to signal applied to terminal 53. The shape of the waveform appearing at the output terminal 55, then, is determined only by the voltage appearing across tunnel diode 33 and is thus independent of the applied signal waveform.

Therefore, the invention provides an inexpensive trigger converter circuit which produces uniformly shaped output pulses having sharp wavefronts which are particularly suited for application to the synchronizing circuit of an electronic instrument. Or a synchronizing circuit having high sensitivity to low level signals comprising the circuit of the present invention can be made which provides a sharp wavefront pulse at susbtantially the same level of applied signal for each pulse cycle. This reduces the apparent time jitter in the location of successively produced output pulses. The noise contributed by the circuit is very small since the tunnel diode is inherently a low impedance device. This limitation, however, does not affect the applied signal since the input diodes provide high impedance termination for the signal. In addition, the repetition frequency of the output pulses may be equal to the applied signal frequency for low frequency signals and may be equal to a subharmonic of the applied signal frequency for very high frequency signals. The converter circuit is particularly suited for producing output pulses having repetition frequencies up to ten megacycles from applied signals having repetition frequencies up to two kilomegacycles.

I claim:

1. A circuit for producing fast rise time output pulses having a repetition frequency that is related to the frequency of an applied signal, said circuit comprising a tunnel diode which shows in the current-voltage characteristic thereof a region of negative resistance between adjacent regions of positive resistance, a variable unidirectional voltage supply to determine the operating point of said tunnel diode, an inductor, said tunnel diode and said inductor being serially connected between said voltage supply and ground, a coupling capacitor connected to the common terminal of said tunnel diode and said inductor to obtain said output pulses from the voltage appearing across said tunnel diode, a current source, a first diode connected between said current source and the common terminal of said tunnel diode and said inductor, a second diode connected to said current source, said first and second diodes connected to conduct the current from said current source, and means providing an alterating current path to said second diode for applied signal and a direct current path to ground for the current through said second diode.

2. A circuit for producing fast rise time output pulses having a repetition frequency that is related to the frequency of an applied signal, said circuit comprising input and output terminals, a variable unidirectional voltage supply, a variable inductor, a tunnel diode which shows in the current voltage characteristic thereof a region of negative resistance between adjacent regions of positive resistance, said tunnel diode and said inductor being serially connected between said voltage supply and ground, a coupling capacitor connecting the common terminal of said inductor and said tunnel diode to said output terminal, a fixed unidirectional voltage supply, a resistor, a first diode, a series circuit including said resistor and said first diode and connecting said fixed unidirectional voltage supply and the common terminal of serially connected inductor and tunnel diode, said first diode being connected to be forward biased, a second diode, and a transformer having primary and secondary windings, said second diode being connected to be forward biased and serving to connect the common terminal of said serially connected resistor and first diode to ground through the secondary winding of said transformer, said primary winding being connected between said input terminal and ground.

3. A circuit for producing fast rise-time output pulses having a repetition frequency related to the frequency of an input signal, said circuit comprising circuit means which shows in the current-voltage characteristic thereof a region of negative resistance between adjacent regions of positive resistance, a source of unidirectional voltage, an inductor, means including said source and inductor for biasing said circuit means, a series circuit including first and second diodes connected in conduction opposition and having end terminals, one of said end terminals being connected to said circuit means, signal conducting means to apply said input signal to the other end terminal of the series circuit, a current source connected to a point intermediate said first and second diodes, and means responsive to the signal appearing across said circuit means to provide said output pulses, said signal conducting means providing a conduction path for the current in one of the first and second diodes.

4. A circuit for producing fast rise-time output pulses having a repetition frequency related to the frequency of an input signal, said circuit comprising a tunnel diode which shows in the current-voltage characteristic thereof a region of negative resistance between adjacent regions of positive resistance, a source of unidirectional voltage, an inductor, means including said source and inductor for biasing said tunnel diode, a series circuit including first and second diodes connected in conduction opposition and having end terminals, one of said end terminals being connected to said tunnel diode, a current source, the first diode and an impedance serially connected to form a first current path, the second diode and said tunnel diode serially connected to form a second current path, means connecting the current source to a point intermediate said first and second diodes, means to apply the input signal to said impedance, and means responsive to the signal appearing across said tunnel diode to provide said output pulses.

5. A circuit for producing fast rise-time output pulses having a repetition frequency relating to the frequency of an input signal, said circuit comprising a tunnel diode which shows in the current-voltage characteristic thereof a region of negative resistance between a high-voltage positive-resistance region and low-voltage positive-resistance region, a source of unidirectional voltage, an inductor, means including said source and inductor for biasing said tunnel diode to operate in the low-voltage positive-resistance region, a series circuit including first and second diodes connected in conduction opposition and having end terminals, one of said end terminals being connected to said tunnel diode, signal conducting means, a current source, the first diode and said signal conducting means forming a first current conduction path, the second diode and said tunnel diode forming a second current conduction path, means connecting said current source to a point intermediate said first and second diodes, means including said signal conducting means to apply said input signal to the other of said end terminals of said series circuit, and means responsive to the signal appearing across said tunnel diode to provide said output pulses.

References Cited in the file of this patent

UNITED STATES PATENTS 2,975,304 Price et al. ............. Mar. 14, 1961